May 13, 1947.    J. L. ANDERSON    2,420,346
REMOTE SPEED CONTROL OF ELECTRIC MOTORS
Original Filed Feb. 15, 1943

INVENTOR
James L. Anderson
BY
ATTORNEYS

Patented May 13, 1947

2,420,346

UNITED STATES PATENT OFFICE 2,420,346

REMOTE SPEED CONTROL OF ELECTRIC MOTORS

James L. Anderson, Closter, N. J., assignor to Air Reduction Company, Incorporated, a corporation of New York Original application February 15, 1943, Serial No. 476,020. Divided and this application March 24, 1943, Serial No. 480,306

4 Claims. (Cl. 171—312)

This invention relates to a system for controlling the speed of an electric motor by remote control.

The present application is a division of my copending application Serial No. 476,020, filed February 15, 1943. That application discloses the motor speed-control system, constituting the subject matter of the present application, as applied to a strip welding machine, but it may be used in various other relations as will hereinafter appear.

The improved system comprises a main working motor whose speed it is desired to control, and an electric pilot motor located at a remote point, such as on a control panel. The pilot motor has an adjustable centrifugal speed governor which may be adjusted at the control panel. The two motors have such characteristics and are so connected to the speed governor on the pilot motor that the one governor on the pilot motor controls not only the speed of the pilot motor but the speed of the remote motor as well, and manual adjustment of the governor of the pilot motor at the control panel to vary its speed produces a corresponding change in the speed of the remote motor.

For illustrative purposes the improved speed control system will be described as applied to the carriage-propelling motor and filler rod feed motor disclosed in the copending application above referred to. The strip welding machine therein disclosed is intended particularly for welding new lengths to a strip of sheet metal to be fed to continuous tube forming and welding apparatus or to a continuous mill for re-rolling. It comprises a self-propelled carriage which is driven by an electric motor and which carries a welding torch and also means operated by an electric motor for feeding filler rod or wire into the weld. In cases where such a torch carriage must operate on large work-pieces involving distances that put the carriage out of reach of the attendant, such as sheet metal made for automobile body presses, it is advantageous to be able to adjust by remote control the speed of the carriage-propelling motor and the speed of the motor which feeds the filler rod or wire.

Figure 1:
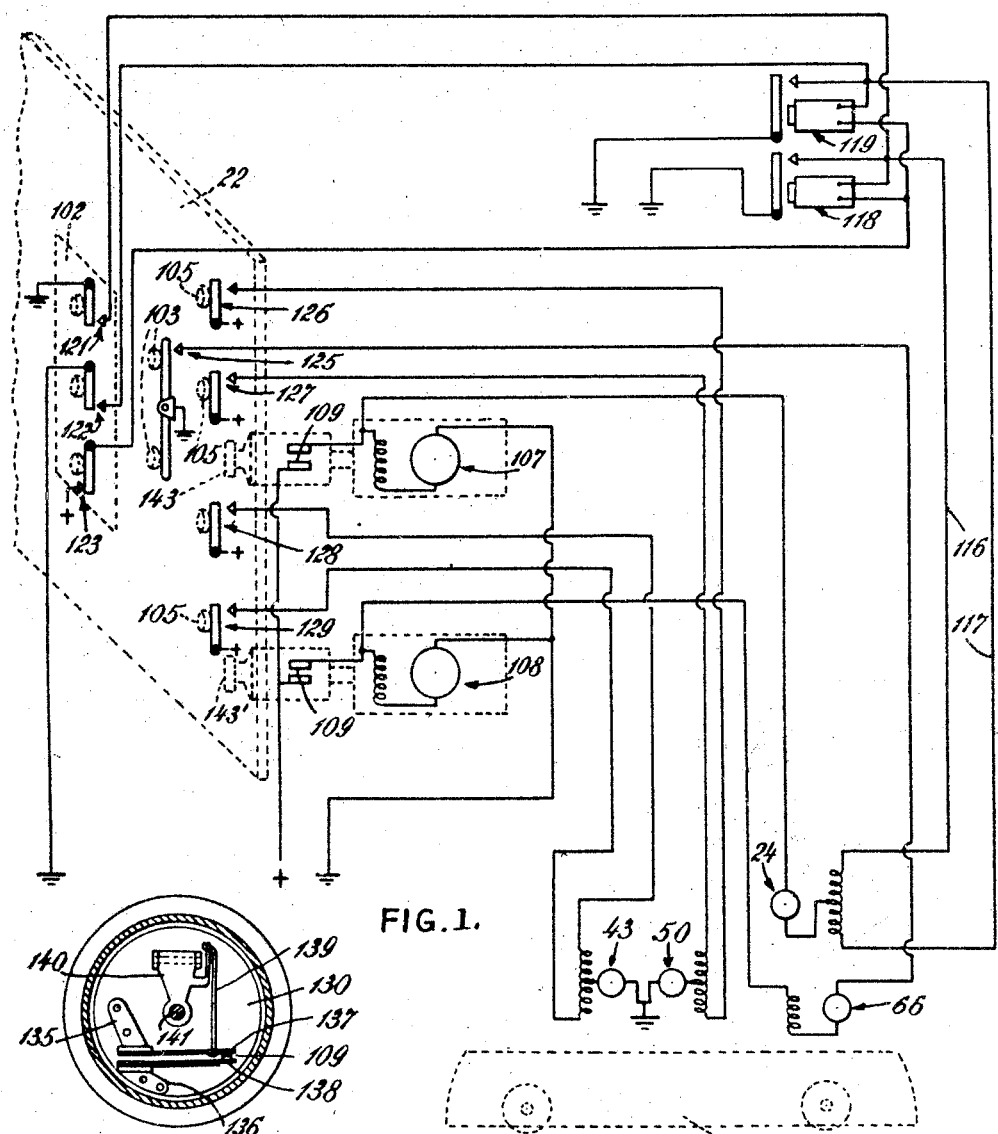
Fig. 1 is a diagrammatic representation of the speed control system applied to the above-mentioned motors on a torch carriage.
Figure 3:
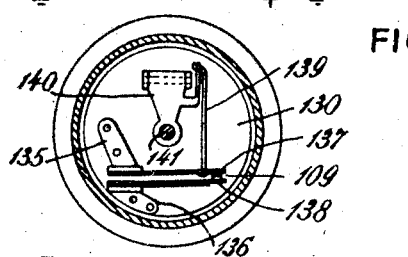
Fig. 3 is a transverse section taken on the line 3—3 of Fig. 2.
Figure 2:
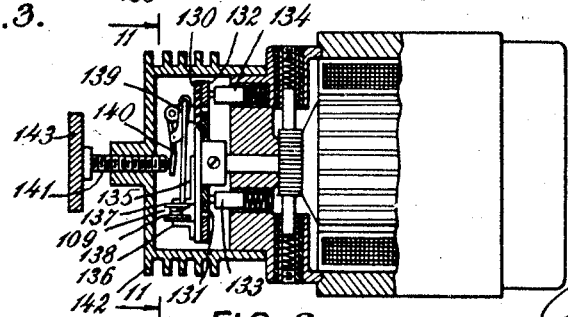
Fig. 2 is a side elevation partly in section of one of the pilot motors and its speed governor.

Two small electric motors preferably of the series-wound type, represented diagrammatically at 107 and 108 in Fig. 1, are supported from the back of a stationary control panel 22 and serve as pilot motors. Each of these motors is equipped with a centrifugal governor which actuates switch contact 109 electrically connected in the motor circuit as hereinafter described. Each motor and its governor may be of a type that is well known and commonly used in mechanical cutting and welding equipment. Such a governor-equipped motor is shown and described in detail in Patent No. 2,032,743, issued March 3, 1936. Figs. 2 and 3 of the present application show enough of the motor and its governor to make the operation of the governor clear. The governor has a plate 130 of insulating material secured to one end of the motor armature shaft. Two concentric conductor rings 131 and 132 are fastened to the inner side of the plate 130, and these conductor rings are contacted by brushes 133 and 134 respectively. Two brackets 135 and 136 are fastened to the outer side of the plate 130 and are electrically connected with the conductor rings 131 and 132 respectively. Spring blade arms 137 and 138 are secured to the brackets 135 and 136 respectively and each of these arms carries one of a pair of switch contacts 109 which normally touch each other. The movement of the outer end of the arm 137 in one direction is limited by a link 139 connected to a bell crank lever 140 which is pivotally supported by the plate 130. A speed-adjusting screw 141 threads through the top of the governor casing 142 and bears against one arm of the bell crank lever 140. The screw 141 has a knob 143 at its outer end for the manual adjustment of the governor.

When the pilot motor is running, the contact ends of both arms 137 and 138 tend to move away from the center of rotation by centrifugal force. The ends of the arms 137 and 138 which are secured to the brackets 135 and 136 are fixed with respect to the plate 130 and the arms must therefore bend as the contact points move away from the center of rotation. These arms being of spring material permit the contact points 109 to move farther as the speed of the motor increases, and the centrifugal force becomes greater. When the arm 137 moves out as far as the link 139 will permit, a further increase in motor speed causes the arm 138 to move away from the arm 137 and break the motor circuit at the contacts 109. As soon as the speed of the motor drops slightly the contacts 109 reclose. The arms 137 and 138 and their contacts thus constitute a switch that is opened by centrifugal force at a certain speed of the motor depending upon the adjustment of the knob 143. By adjusting the knob the speed-level at which the motor is maintained by the governor may be varied.

In Fig. 1 the knob which adjusts the speed governor of the pilot motor 107 is designated 143 while the knob for adjusting the speed governor of the pilot motor 108 is designated 143'. Both knobs may be on the front of the control panel 22.

The propelling motor for the carriage is represented at 24. It is preferably connected in parallel with the pilot motor 107 but in series with the switch contacts 109 controlled by the centrifugal governor of this pilot motor. The wire-feed motor on the carriage 14 is represented at 66. It is preferably connected in parallel with the pilot motor 108 but in series with the switch contacts 109 controlled by the centrifugal governor of this pilot motor. The motor 24 and the pilot motor 107 are of similar construction so that the centrifugal governor driven by the pilot motor 107 holds not only the pilot motor 107 at a substantially constant speed but also holds the motor 24 at a substantially constant speed. By turning the knob 143 to the left, the motor 24 can be made to run faster and the speed of the carriage 14 increased. By turning the knob 143 the other way the carriage 143 slowed down. In welding apparatus of the type herein disclosed the controlled motor 24 operates under substantially constant load conditions and is therefore held at a substantially constant speed by the governor on the pilot motor. Of course, if there is a variable load on the motor 24 the governor on the pilot motor would have to be adjusted with changes in load on the controlled motor if its speed is to be kept constant. The governor on the pilot motor does not necessarily cause the motor 24 to operate at the same speed as the pilot motor, although in practice both motors will probably run at somewhere near the same speed. The important thing is that whatever the speed of the controlled motor happens to be in relation to the speed of the pilot motor, such speed will be held constant by the governor on the pilot motor, when the load on the controlled motor is constant, until the pilot motor governor is changed. By suitable markings on the knob of the pilot motor governor it can be made known at what speed the controlled motor will run when the governor knob is adjusted to a predetermined position.

The motor 66 and the pilot motor 108 are also of similar construction so that the governor driven by the pilot motor 108 holds not only the pilot motor at a substantially constant speed but also holds the motor 66 at a substantially constant speed. In this connection it will be understood that in welding apparatus of the type herein disclosed the motor 66, like the carriage-propelling motor, operates under substantially constant load conditions to change the speed of the pilot motor 108 produces a similar change in the speed of the wire-feed motor 66 on the carriage. The knobs 143 and 143' thus provide a remote control for the speed of the motors 24 and 66 on the carriage 14.

The pilot motors 107 and 108 run continuously when the apparatus is in use. Power is supplied to the carriage motor 24 through the contacts 109 of the governor on the pilot motor 107. The motor 24 is connected with the other side of the line by either of two conductors 116 or 117. The conductor 116 leads to a contact of a normally open relay 118, and when this relay is closed the motor circuit is completed and the motor runs in a forward direction. The conductor 117 leads to a contact of another normally open relay 119, and when this relay is closed the motor 24 runs in a reverse direction.

The switches shown in Fig. 1, with the exception of the switch that is operated by the buttons 103, have a bias toward either open or closed position and are shown in this view in their normal positions, that is, the positions toward which they are biased. The switch operated by buttons 103 has no bias either way.

The top switch button that projects through the plate 102 of the control panel closes a normally open switch 121 that completes the circuit of the relay 118 and causes that relay to be energized. The middle switch button of the plate 102 closes a normally open switch 122 that causes the relay 119 to be energized. The relays 118 and 119 are stick relays and are de-energized by pressing the bottom switch button of the plate 102 to open a switch 123 that connects the coils of both of the relays 118 and 119 with the power line. Opening of the switch 123, therefore, stops the motor 24 no matter which direction it is running. Limit switches, not shown, may be provided for automatically stopping the carriage at or near the ends of its track in a manner well understood in the art.

The wire-feed motor 66 is connected with one side of the power line through the contacts 109 of the speed governor of the pilot motor 108, and to the other side of the power line through a switch 125 that is closed by the upper switch button 103 and opened by the lower switch button 103. As previously explained, the switch 125 has no bias. It remains closed or open until one of the buttons 103 is operated to change the position of the switch. Pressing the top button 103 therefore starts the wire-feed motor 66 and pressing the lower button 103 stops the motor 66.

In practice the different buttons on the control panel are marked to indicate what they control, but the scale of the drawing is not large enough to show these markings. The two motors represented at 43 and 50 in Fig. 1 are for adjusting the welding torch as described in the parent application above referred to, but these motors form no part of the invention of this application.

While the remote control system herein described is particularly useful for controlling the speed of one or more motors on a carriage, such as that employed in mechanical cutting or welding apparatus of the kind above described where the motors operate under substantially constant load conditions, it may be used in many other relations whether the working motor whose speed is to be controlled is mounted on a carriage or not. The motor that is remotely controlled may be any motor producing power to perform useful work under substantially constant load conditions while the pilot motor need not perform work of any kind other than to operate its centrifugal governor which controls the speed of both motors.

While the system has been referred to as a remote control system, it will be understood that the term "remote" is not used to designate the actual distance from the working motor to the control station but to indicate that control in speed of the working motor is accomplished, not by a centrifugal governor or other means on that motor itself, but by adjusting a centrifugal speed governor on a separate pilot or control motor. In fact the pilot motor might even be positioned close to the working motor whose speed is to be controlled if conditions are such that adjustment of a speed governor directly on the working motor would be difficult or impossible, as when it is completely enclosed in a casing or housing and not readily accessible.

I claim:

1. The combination of a self-propelled carriage having an electric motor carried thereby for propelling the same, a pilot motor located at a stationary control station, an adjustable centrifugal governor operated by and responsive to the speed of the pilot motor and having electric switch contacts adapted to be actuated by the governor and electrically connected in a circuit of the pilot motor and also electrically connected in a circuit of the motor on the carriage whereby the speed of both motors is maintained substantially constant when the load on the carriage motor is substantially constant, and manually operable means at the control station for adjusting the governor on the pilot motor whereby the speed at which each motor is maintained by the governor may be varied.

2. The combination of a carriage adapted to move along a course, an electric motor carried by the carriage, a stationary control panel, a pilot electric motor mounted on said panel, an adjustable centrifugal governor operated by and responsive to the speed of the pilot motor for maintaining its speed substantially constant, the motor on the carriage being connected to said governor such that its speed is also maintained substantially constant thereby under substantially constant load conditions, and manually operable means on the control panel for adjusting said centrifugal governor whereby the speed at which each motor is maintained by the governor may be varied.

3. The combination of a carriage adapted to move along a course, an electric motor carried by the carriage, a stationary control panel, a pilot electric motor mounted on said panel, an adjustable centrifugal governor operated by and responsive to the speed of the pilot motor and having electric switch controls adapted to be actuated by the governor and electrically connected in a circuit of the pilot motor and also electrically connected in a circuit of the motor on the carriage whereby the speed of both motors is maintained substantially constant by the single governor when the load on the carriage motor is substantially constant, and manually operable means on the control panel for adjusting said centrifugal governor whereby the speed at which each motor is maintained by the governor may be varied.

4. A speed-control system for electric motors comprising a main working motor whose speed is to be controlled, a pilot motor, an adjustable centrifugal governor for maintaining the speed of said pilot motor substantially constant, said governor being responsive to the speed of the pilot motor, the main working motor being so connected to said governor that its speed also is maintained substantially constant thereby under substantially constant load conditions, and manually-operable means associated with the governor and movable to various positions for adjusting said governor, whereby the speed at which the main working motor runs under constant load conditions is regulatable by said manually-operable means.

JAMES L. ANDERSON.

REFERENCES CITED

The following references are of record in the file of this patent:

UNITED STATES PATENTS

| Number | Name | Date |
|---|---|---|
| 1,676,985 | Haughton | July 10, 1928 |
| 720,729 | McDonnell | Feb. 17, 1903 |
| 1,857,202 | Lee | May 10, 1932 |